May 7, 1963  R. H. LEE  3,089,077
TRANSISTOR CONVERTERS
Filed Oct. 6, 1958

INVENTOR.
ROBERT H. LEE
BY Alfred W. Petchaft
ATT'Y.

3,089,077
TRANSISTOR CONVERTERS
Robert H. Lee, Highland, Ill., assignor to Basler Electric Co., Highland, Ill., a corporation of Illinois
Filed Oct. 6, 1958, Ser. No. 765,612
5 Claims. (Cl. 321—45)

This invention relates in general to converters and, more particularly, to a transistor converter wherein direct current power is converted into alternating current power.

It is the primary object of the present invention to provide a transistor converter in which a minimum of control power is required to drive it.

It is also an object of the present invention to provide a transistor converter of the type stated wherein the power transistors may be operated in the switching mode by relatively low-powered switching-signal sources.

It is a further object of the present invention to provide a transistor converter of the type stated which utilizes a current transformer to provide positive current feed-back from the output of the transistors to the bases thereof.

With the above and other objects in view, my invention resides in the novel features of form, construction, arrangement, and combination of parts presently described and pointed out in the claims.

In the accompanying drawing (one sheet)—

Figure 1:
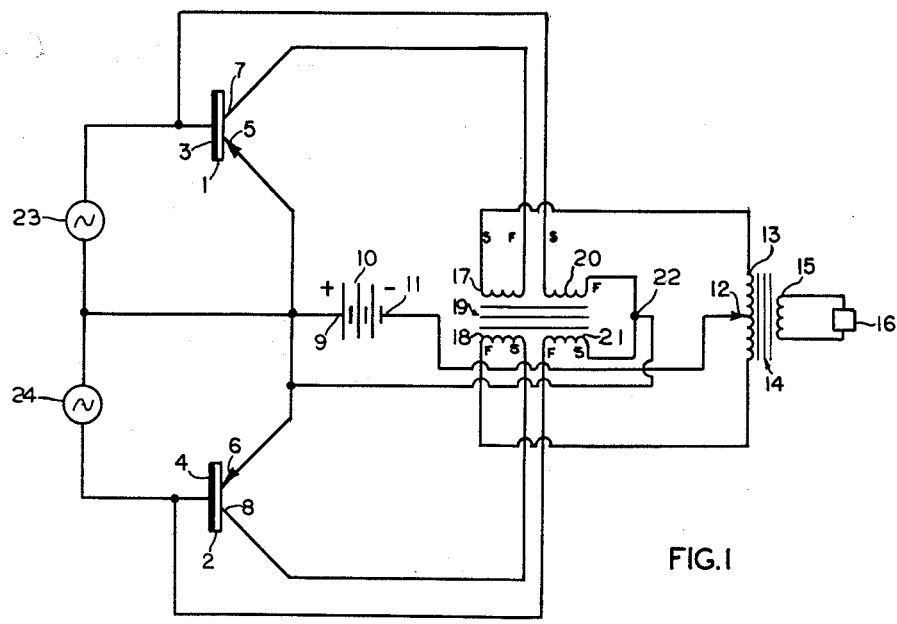
Figure 2:
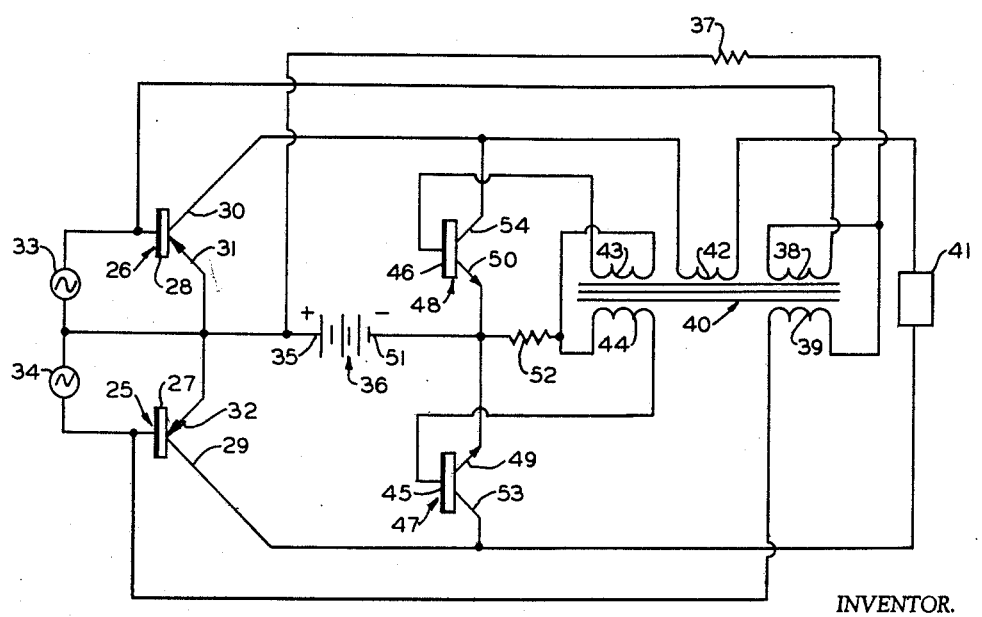

FIG. 1 is a circuit diagram showing a transistor converter constructed in accordance with and embodying the present invention; and FIG. 2 is a circuit diagram of a modified form of a transistor converter.

Referring now in more detail and by reference characters to the drawing, which illustrates a practical embodiment of the present invention, FIG. 1 designates a transistor converter comprising a pair of transistors 1, 2, each having bases 3, 4, emitters 5, 6, and collectors 7, 8. The emitters 5, 6 are connected to the positive terminal 9 of a battery or other suitable source of direct current power 10. The negative battery terminal 11 is connected to the center tap 12 on the primary winding 13 of the power transformer 14, and the secondary winding 15 of the power transformer 14 is connected to a load circuit 16. The collectors 7, 8 are each connected to one end of windings 17, 18 of a current transformer 19, and the other ends of the windings 17, 18 are connected to opposite ends, respectively, of the primary winding 13. The current transformer 19 is also provided with a pair of feed-back windings 20, 21, having a common connection 22, which is, in turn, connected to the battery terminal 9. The letters S and F designate the start and finish of the windings 17, 18, 20, 21, and, therefore, indicate the direction of said windings on the current transformer 19. As shown in FIG. 1 the transistors 1, 2 are of the P-N-P type, but it will be apparent that N-P-N type transistors can also be used in the present circuit. If N-P-N transistors are used, it is merely necessary to reverse the connections to the battery 10.

Connected to the bases 3, 4 for supplying switching-signal current thereto are signal generators 23, 24, which alternately current bias the transistors 1, 2 to allow or block conduction therethrough. Thus, when the transistor 1 is current-biased to allow conduction, the transistor 2 is biased so as to block conduction, and, similarly, when the transistor 2 is biased so as to allow conduction, the transistor 1 is biased to block current conduction therethrough. As a result, the transistors 1, 2 are utilized in the switching mode to supply current from the battery 10 alternately to each half of the primary winding 12. The signal generators 23, 24 may be any suitable source of signal, as, for example, a square wave oscillator, in which case the signal generators 23, 24 each represent one-half of the secondary winding of the output transformer of such oscillator with the ends of the secondary winding connected to the bases 3, 4, and the center tap connected to the battery terminal 9.

Current from the battery 10 passing through the transistors 1, 2 will also pass through the windings 17, 18 on the current transformer 19, and the feed-back windings 20, 21, will, therefore, apply positive current feed-back to the bases 3, 4. In many cases, the driving signal from the signal generators 23, 24 is relatively weak and insufficient to bias the transistors 1, 2, and, in these situations, the current feed-back from the feed-back windings 20, 21 will allow a biasing or switching signal of sufficient magnitude to be applied to the bases 3, 4. Consequently, by use of the current feed-back windings 20, 21, it is possible to utilize, for the signal generators 23, 24, an oscillator having a relatively low power output. For instance, the oscillator may employ small transistors having relatively low power ratings and, moreover, by the use of feed-back it is often possible to eliminate a stage of gain in the oscillator.

It should also be noted that the feed-back windings 20, 21 are coupled so that a positive feed-back current is applied to the transistor bases 3, 4, substantially in phase with the output current of the transistors. Thus, when the transistor 1 is conducting, the feed-back current to the base 3 will be applied so as to promote conduction and, at the same time, the feed-back will be applied to the base 4 so as to block conduction.

It is also possible to provide a modified form of transistor converter as shown in the circuit diagram of FIG. 2 and comprising transistors 25, 26 having bases 27, 28, collectors 29, 30, and emitters 31, 32, all similar to the corresponding elements in the transistors 1, 2, previously described. Connected to the bases 27, 28 are signal generators 33, 34, which are similar to the signal generators 23, 24, previously described, and connected to the emitters 31, 32 is the positive terminal 35 of the source of direct current 36. The positive terminal 35 is also connected through a resistor 37 to the common connection of feed-back windings 38, 39 of a current-transformer 40, the feed-back windings 38, 39 also being connected to the bases 27, 28. The collectors 29, 30 are connected to a load 41 through a winding 42 on the current transformer 40.

Also provided on the current transformer 40 are additional feed-back windings 43, 44, which are connected to the bases 45, 46 of transistors 47, 48, the emitters 49, 50, of which are connected to the negative terminal 51 of the direct current source 36 and also to the feed-back windings 43, 44, through a resistor 52. The collectors 53, 54 of the transistors 47, 48 are, respectively, connected to the collectors 29, 30.

It will, therefore, be apparent that the bridge type circuit of FIG. 2 provides two pairs of transistors with the input switching signal from the signal generators 33, 34 being applied only to the transistors 25, 26. The feed-back windings 38, 39 apply positive current feed-back to the bases 27, 28, while the feed-back windings 43, 44 supply switching-signal current to the bases 45, 46. As the transistor 26 is biased to conduct, the transistor 47 will also be biased to conduct and provide a controlled unidirectional current path for the circuit formed by the transistors 26, 47 and direct current source 36. Similarly, when the transistor 25 conducts, the transistor 48 also conducts and provides a current path in the circuit formed by the transistors 25, 48 and direct current source 36. Consequently, by connecting the transistors 47, 48 across the output of the transistors 25, 26 in the manner described, the need for a power transformer is eliminated and the load circuit 41 can be applied directly to the output of the converter.

It will also be apparent that while the circuits of the present invention provide a full-wave A.C. output to the load, half-wave circuits employing a single transistor may be used in some cases.

It should be understood that changes and modifications in the form, construction, arrangement, and combination of the several parts of the transistor converters may be made and substituted for those herein shown and described without departing from the nature and principle of my invention.

Having thus described my invention, what I claim and desire to secure by Letters Patent is:

1. A device for converting direct current to alternating current comprising a power transformer, a source of direct current having two output terminals, two transistors each having a base, an emitter and a collector, the emitters being permanently connected to one terminal of the source of direct current by a common lead, switching-signal means connected across the bases of the transistors and the common lead to the source of direct current for emanating cyclically alternating signals and thereby alternately biasing the transistors so as to alternately allow conduction and block conduction therethrough, and a current transformer having two power windings, one end of each power winding being connected across the primary of the power transformer and the other ends of said power windings being respectively connected to the collectors of the transistors, said current transformer also having two feed-back windings, one end of each feed-back winding permanently connected in common to the common lead between the emitters of the transistors, the other ends of said feedback windings being respectively connected to the bases of the transistors whereby to deliver feed-back current to said bases of the transistors in simultaneous cyclical concurrence with the signals emanating from said switching-signal means whereby to supplement the transistor-controlling function of said signal.

2. A power supply device for converting direct current to alternating current comprising a direct current source having first and second terminals, a power transformer having a primary winding and a secondary winding, said primary winding having two end terminals and an intermediate terminal tapped off between such end terminals, said intermediate terminal being connected to the first terminal of the direct current source, said secondary winding having output terminals, first and second transistors each having a base, a collector and an emitter, two signal generating means adapted for emanating transistor-controlling signals, each of said signal generating means having two terminals, one terminal of one signal generating means being connected to one terminal of the other signal generating means by a common lead which is also connected to the second terminal of the direct current source, the other terminals of the two signal generating means being respectively connected to the bases of the two transistors whereby to alternately bias the transistors so that during one time-interval the first transistor is conducting while the second transistor is non-conducting and during a next succeeding time-interval the second transistor is conducting while the first transistor is non-conducting, the emitters of the two transistors both being connected in common to said common lead, and a current transformer having first and second current windings and first and second feed-back windings, said current windings and feed-back windings each having a start terminal at which such winding begins and a finish terminal at which such winding ends, the finish terminal of the first feed-back winding and the start terminal of the second feed-back winding being connected in common to said common lead, the start terminal of the first feed-back winding being connected to the base of the first transistor, the finish terminal of the second feed-back winding being connected to the base of the second transistor, the start terminal of the first current winding and the finish terminal of the second current winding being respectively connected to the opposite end terminals of the primary winding of the power transformer, the finish terminal of the first current winding being connected to the collector of the first transistor, and the start terminal of the second current winding being connected to the collector of the second transistor whereby feed-back current will alternately flow from said feed-back windings to the bases of the transistors to supplement the signals emanating from the respective signal generating means.

3. A power supply device for converting direct current to alternating current according to claim 2 in which the intermediate terminal of the primary winding is a center tap which divides the primary with two substantially equal parts.

4. A power supply device for converting direct current to alternating current according to claim 2 in which the direct current source is a battery, the first terminal of such direct current source is negative and the second terminal of such direct current source is positive.

5. A power supply device for converting direct current to alternating current comprising a direct current source having first and second terminals, first, second, third and fourth transistors each having a base, a collector and an emitter, two signal generating means adapted for emanating transistor-controlling signals, each of said signal generating means having two terminals, one terminal of one signal generating means being connected to one terminal of the other signal generating means by a common lead which is also connected to the second terminal of the direct current source, the other terminals of the two signal generating means being respectively connected to the bases of the first and second transistors whereby to alternately bias such transistors so that during one time-interval the first transistor is conducting while the second transistor is non-conducting and during a next succeeding time-interval the second transistor is conducting while the first transistor is non-conducting, the emitters of the two transistors both being connected in common to said common lead between the two signal generating means, and a transformer having first and second current windings, first and second feed-back windings and an auxiliary winding, said current windings and feed-back windings each of the current feed-back and auxiliary windings having opposite end terminals, one end terminal of each feed-back winding being connected in common to the first terminal of the direct current source, the other end terminal of the first feed-back winding being connected to the base of the third transistor, the other end terminal of the second feedback winding being connected to the base of the fourth transistor, one end terminal of each of the current windings being connected in common to said common lead, the emitters of the third and fourth transistors being connected to the common connection between said first and second feed-back windings, the other end terminals of the first and second current windings being respectively connected to the bases of the first and second transistors, the collectors of the first and third transistors being connected in common through the auxiliary winding to one side of the load and the collectors of the second transistor and fourth being connected in common to the other side of the load, said current windings and feed-back windings being coupled in such a manner that feed-back current will alternately flow from said windings to the bases of the transistors to supplement the signals emanating from the respective signal generating means.

References Cited in the file of this patent

UNITED STATES PATENTS

| | | |
|---|---|---|
| 2,772,370 | Bruce et al. | Nov. 27, 1956 |
| 2,774,878 | Jensen | Dec. 18, 1956 |
| 2,783,380 | Bonn | Feb. 26, 1957 |
| 2,785,236 | Bright et al. | Mar. 12, 1957 |
| 2,788,493 | Zawels | Apr. 9, 1957 |
| 2,801,374 | Svala | July 30, 1957 |
| 2,844,739 | Avins | July 22, 1958 |
| 2,849,615 | Gustafson | Aug. 26, 1958 |
| 2,872,582 | Norton | Feb. 3, 1959 |
| 2,875,351 | Collins | Feb. 24, 1959 |
| 2,903,636 | Guyton | Sept. 8, 1959 |
| 2,968,738 | Pintell | Jan. 17, 1961 |
| 2,983,860 | Todd | May 9, 1961 |